United States Patent [19]
McMahon

[11] 4,175,827
[45] Nov. 27, 1979

[54] ELECTRO-OPTICAL MULTIPLEXER HAVING MULTIPLE FREQUENCY RESONANT EXCITATION

[75] Inventor: Donald H. McMahon, Carlisle, Mass.
[73] Assignee: Sperry Rand Corporation, New York, N.Y.
[21] Appl. No.: 879,309
[22] Filed: Feb. 21, 1978
[51] Int. Cl.$^2$ .............................................. G02B 5/14
[52] U.S. Cl. ................................. 350/96.14; 250/199
[58] Field of Search ........................ 350/96.14, 96.13; 250/199

[56] References Cited

U.S. PATENT DOCUMENTS

| 3,695,745 | 10/1972 | Furukawa | 350/96.14 |
| 3,795,433 | 3/1974 | Channin | 350/96.14 |

OTHER PUBLICATIONS

Soref et al., "Multimode Achromatic Electro-Optic Waveguide Switch for Fiber-Optic Communications", *Appl. Phys. Letts.*, vol. 28, No. 12, Jun. 1976.
Nelson et al., "Electro-Optic Multiplexer for Large-Numbered-Aperture, Low-Loss Fibers", *Optics Letts.*, vol. 1, No. 1, Jul. 1977.

*Primary Examiner*—Stewart J. Levy
*Attorney, Agent, or Firm*—Howard P. Terry

[57] ABSTRACT

An improved optical multiplexer or demultiplexer device has a plurality of electrodes disposed on opposing surfaces of an electro-optically active plate that are resonantly excited at fundamental and harmonic frequencies for varying the effective index of refraction of the plate between the electrodes, thus coupling light successively between a first optical guide and selected ones of a plurality of optical guides.

20 Claims, 4 Drawing Figures

ELECTRO-OPTICAL MULTIPLEXER HAVING MULTIPLE FREQUENCY RESONANT EXCITATION

BACKGROUND OF THE INVENTION

1. Field of the Invention

The present invention relates generally to electro-optical devices for directing the propagation of light energy and, more particularly, concerns light guiding apparatus for multiplexing and demultiplexing data conveyed by propagating light streams.

2. Description of the Prior Art

Arrangements for guiding multimode optical beams within plates of electro-optical materials such as $LiTaO_3$, $LiNbO_3$, or the like have been discussed by the present inventor and his associates in the technical paper: "Electro-Optic Channel Waveguide Modulator for Multimode Fibers," *Applied Physics Letters*, Volume 28, No. 6, Mar. 15, 1976, page 321. In such devices, opposed metal strip electrodes may be affixed to both major faces of the transparent electro-optically active plate. Light is coupled into and out of the plate by glass fiber guides abutting at normal incidence the ends of the active plate adjacent opposite ends of the electrodes. Small refractive index changes produced in the electro-optic plate when suitable voltages are applied to the opposed electrodes control propagation of light from the input fiber guide with respect to an output fiber guide. Thus, modulators, hybrid couplers, and switches have been devised using various configurations of such guided wave optical systems. Also, multiplexing and demultiplexing devices have been formed by combining a plurality of electrically switchable three-port hybrid couplers. Two such switchable hybrid couplers may be combined to form a high-isolation single-pole, double throw switch, while N such couplers may be employed to generate an electrically controllable N:1 multiplexer or demultiplexer.

Electrically switchable three-port optical hybrid couplers exist in the prior art. However, with the exception of the coupler described by the present inventor and his associates in the technical paper: "Multimode Achromatic Electro-Optic Waveguide Switch for Fiber-Optic Communications," *Applied Physics Letters*, Volume 28, No. 12, June 15, 1976, page 716, these prior art switchable hybrid couplers generally operate only with a single mode of optical energy propagation and therefore do not have certain desirable structural features and the consequent advantages of the multimode coupler. The switchable multimode coupler of the latter technical paper is again provided with input and output fibers and with pairs of electrodes that are electrically decoupled by a gap therebetween to establish a main optical channel and a branching channel. A voltage is applied to the main channel electrodes across the thickness of the crystal in a manner to induce a refractive index increase and to form a light wave guide under the same electrodes. With no voltage or a reverse voltage applied to the branch guide electrodes, light energy does not significantly couple to the branch channel. When a voltage is applied to the branch guide electrodes, the light energy propagating in the main channel is caused to divide between the two optical channels.

These and other electro-optically switchable multimode devices may be used according to the present invention to afford efficient multiplexer or demultiplexer devices. For example, a further switchable coupler device suitable for the present purpose is presented in the A. R. Nelson U.S. patent application Ser. No. 796,103, filed May 12, 1977 for an "Electro-Optic Multiplexer with High Interchannel Isolation" and assigned to Sperry Rand Corporation. This latter device employs input and output fiber guides coupled to optical barrier wave guides formed by the application of voltages to electrodes positioned on the top and bottom surfaces of an electro-optic crystal to decrease the refractive index in the crystal between the electrodes and thus to form optical wave guides which are outlined by the electrodes. The electrodes may be positioned, for example, to form a main optical wave guide, a branch optical wave guide, and an optical gate at the intersection of the main and branch wave guides. Coupling of optical energy from the main wave guide to the branch wave guide is accomplished by removing the voltage from the gate electrode, thus eliminating the barrier existing between the two wave guides. Optical energy may be switched between the two wave guides by providing a second gate electrode in the main wave guide path and alternately applying a voltage between the two gate electrodes.

These and other switchable coupler devices, whether single or multimode, generally require relatively large voltages and power levels for excitation of the switching electrodes. These voltage levels, being of the order of 400 volts, for example, represent a principle limitation to the utility of prior electrically switchable devices with respect to, for instance, switches, multiplexers, and demultiplexers of the surface wave type. To realize a truly competitive optical multiplexer design, the low switching voltage levels available from simple conventional semiconductor driver stages are needed, levels such as about five volts. While the optical requirements for multiplexing will be reasonably well met by available prior art switchable optical couplers, the voltage and consequent power requirements have not been economically met. It is therefore the primary object of the present invention to provide a system for operating electrically switched coupler devices in optical multiplexers and demultiplexers such that relatively low excitation or switching voltages and low power may be efficiently employed.

SUMMARY OF THE INVENTION

The present invention relates to electro-optical devices for directing the propagation of light signals, especially light guiding devices intended for the multiplexing and demultiplexing of data in coded form conveyed by propagating light streams. The multiplexer or demultiplexer embodiments of the invention employ a plurality of light-guiding electrodes disposed on opposing surfaces of an electro-optically active plate, the electrodes being resonantly excited at fundamental and harmonic frequencies for selectively varying the effective index of refraction of the electro-optic plate. In this manner, light is coupled successively between an input optical guide and selected ones of a plurality of optical signal propagating guides.

DESCRIPTION OF THE PREFERRED EMBODIMENTS

Figure 1A:
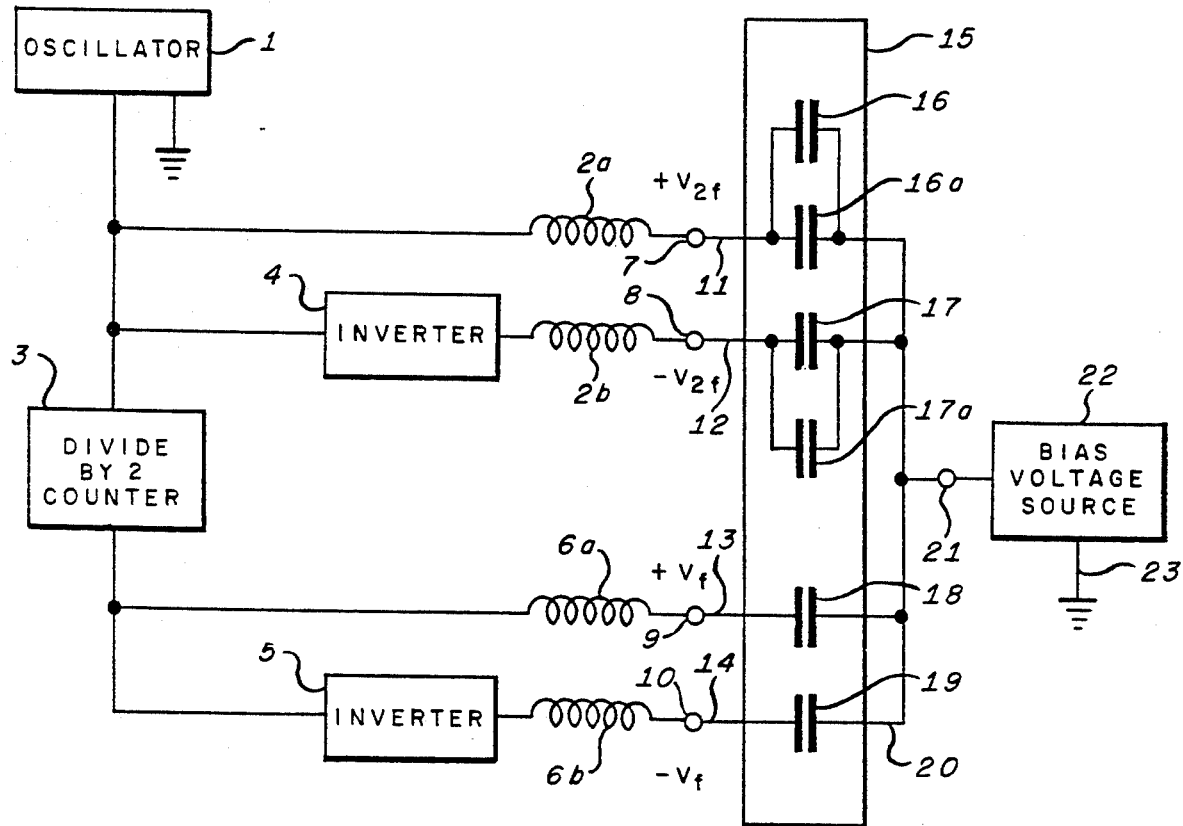
FIG. 1A is a wiring diagram of the system for generating the excitation voltages at harmonically related frequencies.
Figure 1B:
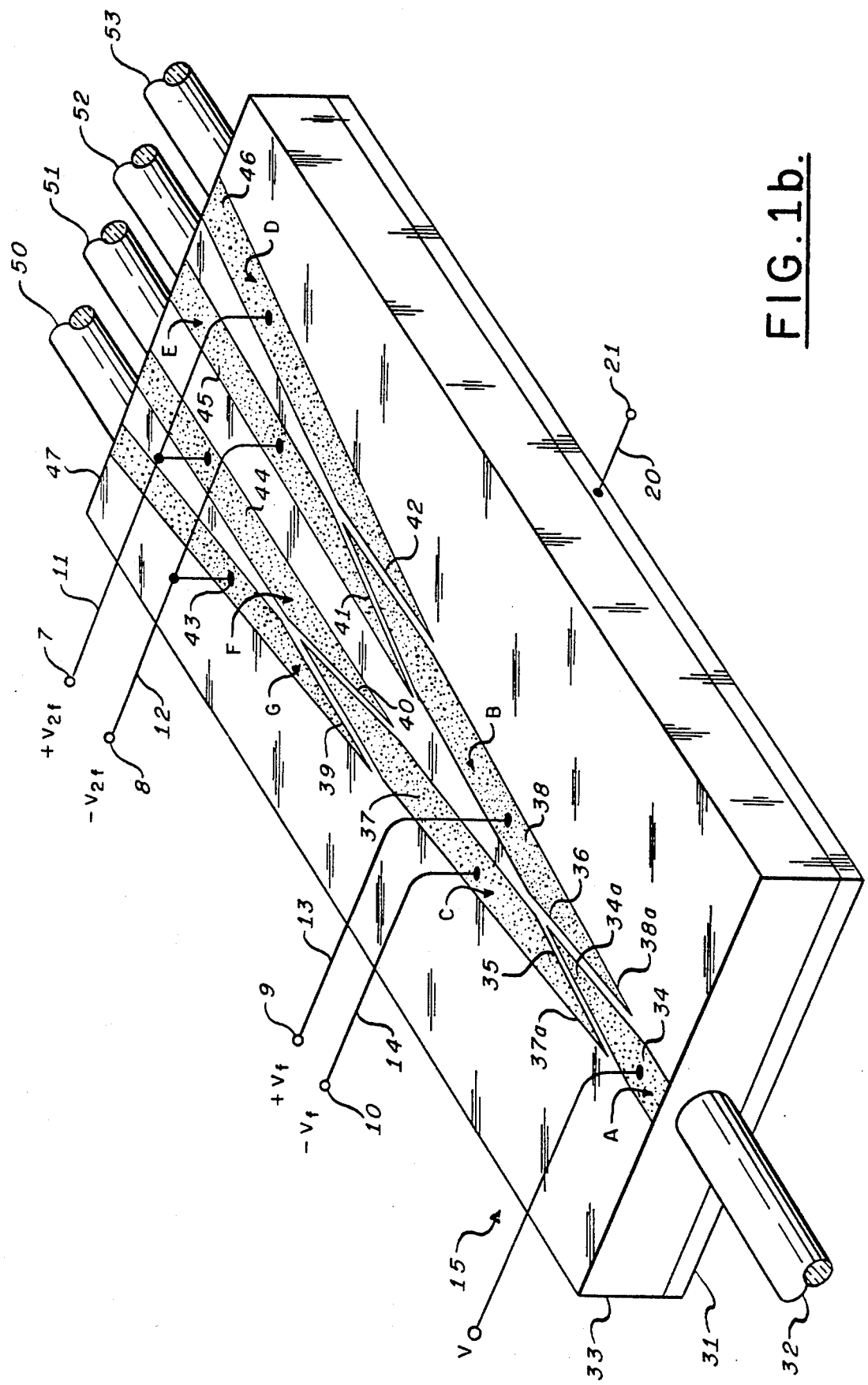
FIG. 1B is a perspective view of one embodiment of the invention.

In FIGS. 1A and 1B, the present invention is shown as a switchable optical coupling device in the form of a multiplexer or demultiplexer 15 using triple-port electrically switchable couplers of the general type described in the aforementioned references. Three such optical hybrid couplers are used to generate a 1:4 device; thus, a single conventional input optical fiber guide 32 is enabled for demultiplexing purposes selectively to couple optical signals to any of four similar output optical fiber guides 50, 51, 52, 53. On the other hand, separated input signals appearing within the four fiber optic guides 50, 51, 52, 53 may be selectively and exclusively propagated into fiber optic guide 32, which guide is now used as a multiplexer output.

The electro-optical parts of the invention are formed on a thin plate 33 which may be Z-cut LiTaO$_3$, LiNbO$_3$, or a similar readily available electro-optically sensitive material. Electrically conductive electrodes are evaporated or otherwise formed using conventional techniques on each of the broad faces of transparent plate 33. The electrode 31 on the bottom of plate 33 may simply be a thin metal film covering the entire area of the bottom surface, thus serving readily via lead 20 and terminal 21 as a ground or other reference potential plate for the upper surface electrodes and forming individual capacitors with them.

The several upper surface electrodes 34, 37, 38, 43, 44, 45, 46 are readily formed simultaneously in insulated relation by the conventional evaporation of an electrically conductive metal such as gold, silver, or aluminum through a suitable mask. A first electrode 34 forming a channel A extends from the input face of plate 33 to a pair of electrically isolating gaps 35, 36; electrode 34 cooperates with the bottom electrode plate 31, when a proper voltage is applied therebetween, to form a wave guide in which optical energy readily propagates with respect to a fiber optic guide 32 butt coupled against the flat input face of plate 33. To form a symmetric branching Channel B and Channel C configuration of optical couplers, electrode 34 is brought to a narrow angled symmetric apex 34a and the tapers 37a and 38a of respective electrodes 37 and 38 are disposed on either side of apex 34a as illustrated. The angles of apex 34a and of tapers 37a and 38a are shown in an exemplary manner as a matter of convenience, and it will be understood that smaller angles may advantageously be employed so that the gaps 35 and 36 are significantly longer than shown and so that a greater proportion of the input light may more readily be diverted either into Channel B or into Channel C.

Beyond electrically insulating gaps 35, 36 at the ends of electrodes 37 and 38 opposite electrode 34 are disposed two additional switchable couplers feeding light selectively into four output Channels D, E, F, or G. These latter channels include four additional metal electrodes for defining four additional electrically selectable possible light propagation paths disposed in a generally symmetric fan-shaped pattern. Such electrodes 43, 44, 45, 46 are respectively switchably coupled to electrodes 37 and 38 by the use of gap and branching guide arrangements similar to those described relative to apex 34a and the tapered portions 37a, 38a of the first or input optical switch. In this manner, the pointed output end of electrode 37 cooperates with tapered parts of output guide electrodes 43 and 44 to form an electrically controllable switch for directing light flowing below electrode 37 and under gap 39 or gap 40 to continue to flow under one or the other of the respective electrodes 43 or 44 into a selected one of the respective output fiber guides 50 or 51. Furthermore, the pointed output end of electrode 38 cooperates with the tapered parts of output guide electrodes 45 and 46 to form a further electrically controllable switch for directing any light that may be flowing below electrode 38 and below gap 41 or gap 42 to propagate selectively below one or the other of the respective electrodes 45 or 46 into a consequently selected one of the respective output fiber guides 52 or 53. It will be understood that fiber optic guides 50 through 53, like fiber optic guide 32, are affixed in butted relation against the flat output face of plate 33, being held there in any convenient conventional manner.

FIG. 1A illustrates a particular feature of the present invention whereby voltage and power levels for switching the light paths with respect to the three switchable couplers may be substantially reduced. As noted, the bottom metal plate 31 forms a capacitor with each of the several upper electrodes; consider, for example, the capacitor having capacitance C formed in plate 33 by the presence of electrodes 31 and 37. The energy U required to charge such a capacitance C to a voltage level V is $\frac{1}{2}$ CV$^2$. Capacitance C is to be, in typical multiplexing and demultiplexing operations, cyclically charged and discharged at a frequency f, resulting in a power dissipation P=fCV$^2$.

For example, assume that the device has a capacitance C of 20 picofarads for each electrode capacitor, and that it is required that the electrode is to be excited at a 1.2 MHz rate to a 400 volt level. The power P consumed would be approximately 4.0 watts. The 1.2 MHz rate is assumed because the switching rate must be high compared to the rate of data flow. This model is too simplistic, however, in that the true capacitive load not only includes the capacitance C of the electrodes, but must include the capacitances of the driving circuits, electrical leads, and the like. In practice, a much more realistic estimate of the true capacitive load per electrode is 10$^3$ picofarads, which accounts for an observed reactive power dissipation of approximately 200 watts, for example, in a 1:4 optical multiplexer.

According to the present invention, the undesired power loss per electrode is reduced by the quality factor Q by including the effective capacitance C of each electrode pair and its associated circuit in a tuned circuit excited at resonance, so that the power dissipation is reduced by orders of magnitude to fCV$^2$/Q. Values of Q of 100 are readily attained, so that the power loss, for example, for a 4:1 multiplexer excited in this manner would be only 0.04 watts. Moreover, if each electrode capacitance is included as a part of a tuned circuit, the voltage across the plate 33 at each electrode is greater by the ratio Q than the voltage across the terminals of the tuned circuit. With a Q of 100, a readily available 5 volt driver output signal is converted by the tuned circuit into a 500 volt signal across a multiplexer electrode pair. Hence, with resonant drive, the device may be excited directly with no difficulty from a conventional 5 volt semiconductor driver circuit capable of supplying only a modest driving power.

According to the present invention, driving of the switching electrode system is further benefited by the harmonic driving circuit of FIG. 1A wherein a master oscillator 1 is provided operating, for example, at a frequency 2f of 1.2 MHz. The direct 2f output of oscillator 1 is coupled through inductance 2a and terminal 7 for resonant excitation of the parallel capacitors 16 and 16a; capacitors 16 and 16a; represent the respective capacitance between electrodes 44 and 31 and between electrodes 46 and 31 in FIG. 1B. The direct output of oscillator 1 is also coupled through inverter 4 and the inductance 2b for excitation of the parallel capacitors 17 and 17a; capacitors 17 and 17a represent the respective capacitances between electrodes 43 and 31 and between electrodes 45 and 31 in FIG. 1B. A unidirectional bias source 22, if required, may be coupled between the aforementioned capacitors 16, 16a, 17, 17a and ground via terminal 21 and lead 23.

Oscillator 1 also feeds the 2f signal to a conventional divide-by-two counter 3, whose f output is coupled directly through inductance 6a and terminal 9 across capacitor 18. Also, the output of divider 3 is passed by inverter 5 through the inductance 6b and terminal 10 to capacitor 19. Capacitors 18 and 19, respectively, represent the respective capacitances formed in FIG. 1B between electrodes 38 and 31 and between electrodes 37 and 31.

Figure 3:
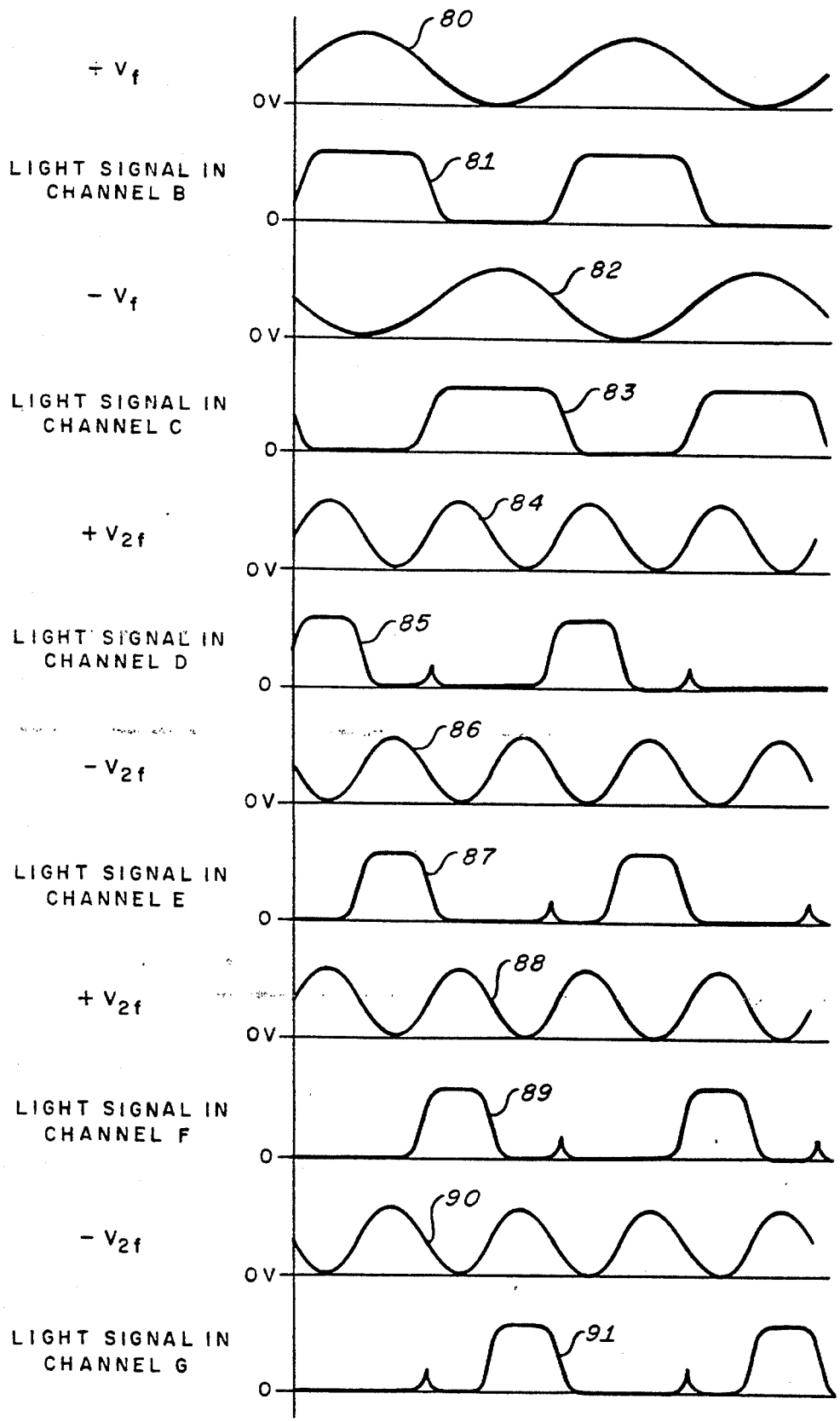
FIG. 3 is a wave form diagram useful in explaining the operation of the invention.

The phase relations between the f and 2f signals are appropriately adjusted as illustrated in the wave forms of FIG. 3 so that the electrodes 37 and 38 for forming Channels B and C (FIG. 1B) are excited sinusoidally at frequency f, while electrodes 43, 44, 45, and 46 are excited sinusoidally at frequency 2f. The switching excitation of electrodes 37 and 38 at frequency f directs light in the operation of multiplexer 15 every half cycle of frequency f into one or the other of the respective branching Channels B and C lying below electrodes 37 and 38.

The output branching Channels F and G associated with gaps 39, 40 and the respective electrodes 43 and 44 operate with electrodes 43 and 44 excited at frequency 2f. Assume, for example that, on a first half cycle of frequency f, light is directed into Channel C. As the 2f voltage applied to electrodes 43 and 44 goes through its corresponding full cycle, light is first directed from Channel C to the left into Channel G, for example. During this one half cycle of the frequency f, light is inhibited from flowing in Channel B while the voltage $V_{2f}$ applied to electrodes 43, 44 passes through its complete cycle, first allowing light propagation into Channel G and then into Channel F and thus into fiber optic guide 51.

Immediately following, the input switch is activated by the change of phase of frequency f on electrodes 37, 38 to direct light from Channel A into Channel B. Hence, light is now directed in Channel B under electrode 38 and past gaps 41, 42. Now, by virtue of the 2f voltage on electrodes 45 and 46, it is directed first to fiber optic output guide 52 and then to fiber optic output guide 53 as the frequency 2f goes through successive half cycles. This cyclic behavior repeats, demultiplexing the input on fiber optic guide 32 successively into output guides 50 through 53 or vice versa during multiplexing. It will be apparent that the 2f signal is present across the effective capacitors 16, 16a, 17, 17a whether or not light is flowing within the corresponding Channels D, E, F, G, so that the 2f resonant circuit remains constantly tuned to that frequency.

Operation during multiplexing and demultiplexing can be understood with the realization that the plate 33 behaves with respect to any one of the four optical guides 50, 51, 52, and 53 as a tandem arrangement of two Y-couplers. With the appropriate d.c. bias applied to electrode 31, the light signal transmitted from Channel A to Channel B or C can be represented approximately by the respective functions $\frac{1}{2}(1+\sin ft)$ or $\frac{1}{2}(1-\sin ft)$. Using similar functional representations for the remaining Y-couplers and realizing that the light signal that arrives at output 50, 51, 52, or 53 is a product of transmission factors for the two intermediate Y-couplers, the light signal arriving at each of the four outputs may be represented approximately by the four factors represented by $\frac{1}{4}(1 \neq \sin ft)(1 \neq \sin 2 ft)$. In practice, sufficient voltages of either polarity serve efficiently to redirect the light into a Y-coupler in one of two directions. Consequently, large alternating voltages cause the light signal levels to saturate in both the on and off states as shown more clearly in FIG. 3.

Employing such switching, two sinusoidal frequencies, harmonically related and locked in proper phase relationship, serve sequentially to distribute the incoming light signals into selected ones of the four output ports 50 through 53 so that 4:1 time division multiplexing is afforded. The reciprocity rule dictates that the same device will function interchangeably as a multiplexer or as a demultiplexer. Furthermore, it will be clear to those skilled in the art that the invention may readily be extended to supply multiplexer and demultiplexers where the N:1 ratio is $2^N$, where N is the number of successive switching stages of the device and $2^N$ is the number of input or output ports coupled to a single output or input port. In these cases, the N excitation voltages required are f, 2f, 4f, ... $2^N f$, respectively. It will be apparent to those skilled in the art that the two stage excitation circuit of FIG. 1B may readily be extended to include higher numbers of switching stages.

Figure 2:
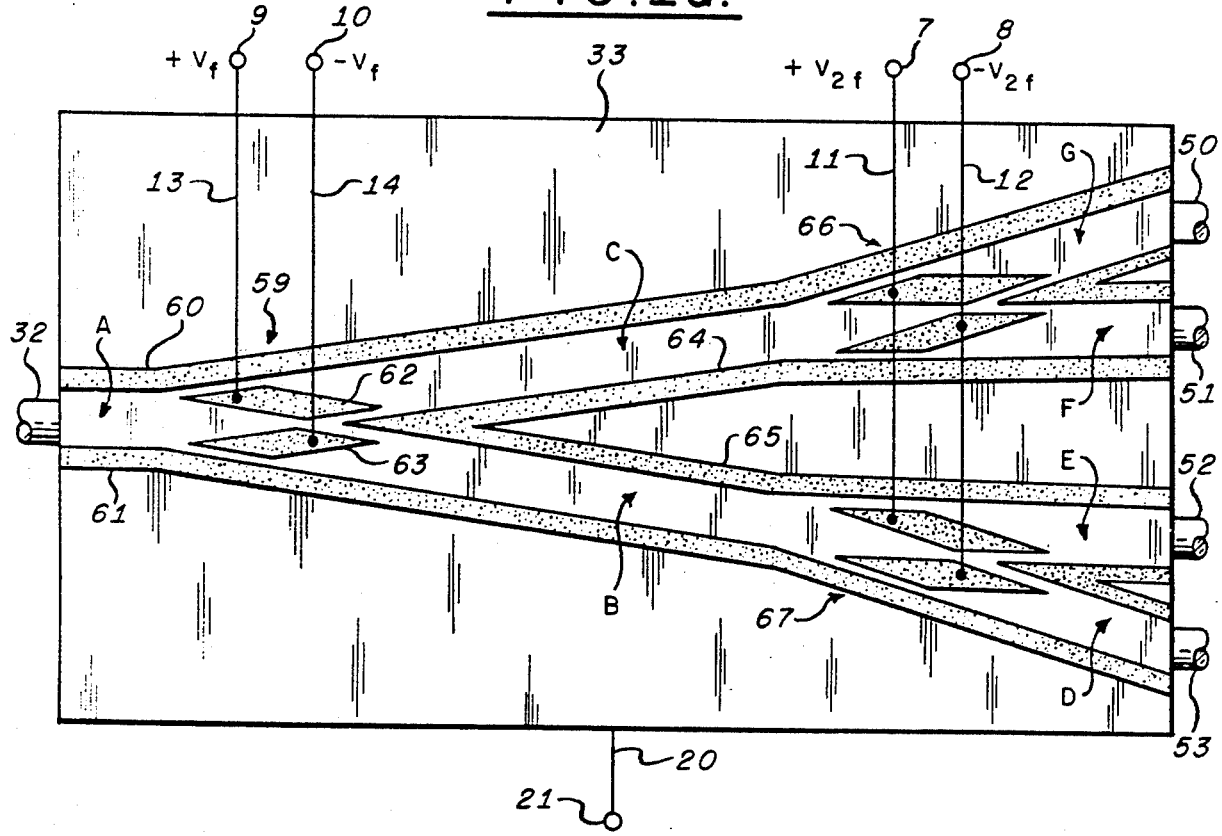
FIG. 2 is a plan view of a second embodiment of the invention.

The novel principles of the present invention may readily be used in constructing multiplexer-demultiplexer devices based upon other electrically switchable coupler devices. For example, the configuration of FIG. 2 illustrates a further relatively symmetric arrangement using electrically alterable couplers that are modifications of the couplers described in the aforementioned Nelson patent application Ser. No. 796,103.

The Nelson specification provides a unique light path switching device, again suitable for use on a plate 33 of electro-optically active material, but employing light guiding principles distinct from those used in the switches of FIG. 1B. In FIG. 2, the input optical wave guide forming Channel A consists of two barrier electrodes 60 and 61 which may be evaporated on both sides of transparent plate 33. A voltage applied between electrodes 60, 61 and the opposed electrodes or electrode 31 has a polarity such that a decrease in the refractive index is afforded in the space affected by the electrode fields. The change in index creates barriers defined by the electrode configuration which will reflect light incident thereon that has been launched in the regions between the barriers, thus forming an optical wave guide generally defined by the barrier electrode pattern.

In describing the typical Nelson switch cooperating in FIG. 2 with input fiber guide 32, when the voltage is applied to barrier electrodes 60, 61, there will be established an input wave guiding Channel A. Barrier electrodes 64 and 65 cooperate with the respective electrodes 60, 61 to form propagating Channels B and C when similarly excited. It will be apparent that two branching light guides are thus formed symmetrically with respect to Channel A. Isolated gate electrodes 62, 63 are disposed in opposed relation at the mouths of Channels A and B; for example, gate electrode 63 is placed in the mouth of Channel B as if it were essentially a continuation effectively joining barrier electrodes 61 and 64 as a closed or continuous optical guide. Thus, when a barrier-creating voltage is applied to gate electrode 63 and not to gate 62, the light in Channel A propagates smoothly into Channel C. On the other hand, if the switching voltage were applied to the opposed gate electrode 62, and not to gate 63, light would propagate from Channel A into Channel B.

For effecting multiplex or demultiplex operation, with respect to the four output fiber optic guides 50 through 53, an additional pair of switches 66 and 67 such as the Nelson switches are coupled to Channels B and C. In this manner, gate electrodes in switch 66, when excited at frequency 2f, divert light flowing in Channel C either into Channel G or Channel F. Similarly, gate electrodes within switch 67 divert light, when it is flowing in Channel B and when the gates are excited at frequency 2f, either into Channel E or Channel D. Thus, as in the arrangement of FIGS. 1A and 1B, the signal of frequency f applied to leads 9 and 10 and the signal of frequency 2f applied to leads 11 and 12 cooperate to cause successive and repetitive scanning of any light signal present in fiber optic guide 32 into guides 50, 51, 52, and 53.

Such operation with respect to the devices of FIGS. 1B and 2 will be fully apparent from the foregoing discussion. In FIG. 3, the individual wave forms producing the desired progressive and cyclic change in the effective index of refraction of plate 33 are illustrated. Wave 80 represents the voltage wave $+V_f$ applied to terminal 9 of either device, and wave 82 the inverted wave $-V_f$ coupled to terminal 10. Waves 81 and 83 represent the corresponding light impulses directed successively into Channels B and C from Channel A. The waves 84 and 88 are the voltage wave $+V_{2f}$ applied to terminal 7, and the waves 86 and 90 are the corresponding voltage wave $-V_{2f}$ applied to terminal 8. As a consequence of the cooperation between the f and 2f waves, the successively phased light impulses 85, 87, 89 and 91 are found at the respective output Channels D, E, F, and G of the devices.

In the normal operation of the FIG. 1B embodiment, the switching polarities will be such as to increase the index of refraction of the portions of plate 33 associated with the several channels. Therefore, the applied alternating voltage will normally vary between zero and a peak voltage value of the correct polarity so as always to induce an increase in the index. In special circumstances in which the signal-to-noise ratio is to be maximized, it may be desirable to force each of the several channels to be slightly anti-guiding during the non-propagating phase of the excitation voltage, whether it is $V_f$ or $V_{2f}$. In this case, the sine waves 80, 82, 84, 86, 88, and 90 will be permitted to fall slightly over the zero voltage axis. instead of being simply tangent thereto. It should also be noted, in the FIG. 2 structure, that the voltage applied to the barrier electrodes 60, 61, 64, 65, et cetera, should be of a polarity such as to cause a decrease in the index of refraction of the active plate 33. The gate electrodes 62, 63, et cetera, should operate between zero volts and a peak voltage that causes a decrease in the index of refraction of plate 33, hence inhibiting the passage of light therethrough. It will further be understood that higher orders of multiplexing or demultiplexing may be achieved according to the invention. For this purpose, an additional switching section or array may be added to the first and second arrays shown in the figures. In FIG. 1B, for example, Channels D, E, F, and G may be fed one each into a third array of four switches for multiplexing with respect to eight output channels, for example. The switching frequencies would now be in the ratios of 1:2:4. In more generality, the invention may be extended to supply multiplexer designs, for example, having a ratio of $2^N$, where N is the number of stages and $2^N$ is the number of output (or input) ports coupled to a single input (or output port). In this situation, N excitation voltages are required at frequencies f, 2f, 4f, . . . $2^N f$, respectively. Other variations of the invention will readily occur to those skilled in the art.

Accordingly, it is seen that the invention is an improved multimode light signal multiplexing and demultiplexing system employing a plurality of resonantly excited light guiding electrodes, the electrodes being disposed on opposite sides of an electro-optically active plate. Excitation at fundamental and harmonic frequencies affords selective variation of the effective index of refraction of the plate, coupling light streams successively between one optical wave guide and successively selected ones of an array of optical wave guides. The invention permits efficient driving of the electrodes using a low voltage alternating power source. Time division switching or multiplexer or demultiplexer action is achieved in a compact, integrated structure without the need of high switching voltages, both power and voltage requirements being reduced by a factor equal to the quality factor Q of the associated tuned circuit.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Switchable optical coupling apparatus comprising:
a plate of optically transparent material characterized by an electrically variable effective index of refraction,
first isolated electrode means for establishing a first electric field through said plate for changing the effective index of refraction thereof at a first location, thereby establishing a first pair of selectable diverging light paths within said plate normal to said variable electric field,
said first isolated electrode means being excited by a fundamental frequency sinusoidal voltage, and
second and third isolated electrode means disposed in cooperative relation with said respective first pair of selectable diverging light paths for establishing second and third electric fields through said plate for changing the effective index of refraction thereof at respective second and third locations spaced from said first location, thereby establishing second and third pairs of selectable diverging light paths within said plate respectively normal to said second and third variable electric fields, said second and third isolated electrode means being excited by a frequency that is harmonic of said fundamental frequency sinusoidal voltage, said fundamental and harmonic sinusoidal frequency voltages being phased in a predetermined manner whereby discrete ones of said second and third pairs of selectable diverging light paths are selected.

2. Apparatus as described in claim 1 wherein said harmonic and fundamental sinusoidal voltages have frequencies in the ratio of two to one.

3. Apparatus as described in claim 2 wherein the amplitudes of said harmonic and fundamental sinusoidal voltages are substantially equal.

4. Apparatus as described in claim 1 wherein said plate is further characterized by:
first and second opposed major surfaces, and
first and second opposed minor surfaces disposed in substantially perpendicular relation to said major surfaces.

5. Apparatus as described in claim 4 further including:
first light guiding means in light exchanging relation with said plate at said first minor surface, and
a plurality of light guiding means in light exchanging relation with said plate at said second minor surface.

6. Apparatus as described in claim 5 wherein said first, second, and third isolated electrode means are disposed at least at one of said opposed major surfaces for establishing said first, second and third pairs of selectable diverging light paths through said plate between said first light guiding means and said plurality of light guiding means.

7. Apparatus as described in claim 6 wherein:
said first, second, and third isolated electrode means respectively form first, second, and third capacitive means with the material of said plate means,
oscillator means, and
first inductive means in series with said oscillator means for resonating said first capacitance means at the frequency of said fundamental voltage.

8. Apparatus as described in claim 7 further including:
frequency divider means responsive to said oscillator means,
second inductive means in series with said frequency divider means for resonating at least said second capacitive means at the frequency of said harmonic voltage.

9. Apparatus as described in claim 6 wherein:
said first, second, and third isolated electrode means respectively form first, second, and third capacitive means in cooperation with said plate means,
signal generator means, and
first and second inductive means responsive to said signal generator means,
said first capacitive means and said first inductive means forming means resonant at said fundamental frequency, and
said second and third capacitive means and said second inductive means forming means resonant at said harmonic frequency.

10. Apparatus as described in claim 5 wherein said first and said plurality of light guiding means comprise fiber optic light guiding means affixed in abutting relation to said plate.

11. Switchable optical coupling apparatus comprising:
a plate of optically transparent material characterized by an electrically variable index of refraction and having:
first and second opposed major surfaces, and
first and second opposed minor surfaces substantially perpendicular to said major surfaces,
first light guiding means in light exchanging relation with said plate at said first minor surface,
a plurality of light guiding means each in light exchanging relation with said plate at said second minor surface,
a plurality of electrode means disposed at said opposed major surfaces for forming a plurality of selectable light paths through said plate means between said first guiding means and ones of said plurality of light guiding means,
at least a first pair of said plurality of electrode means providing means for switching light propagated in said first light guiding means with respect to first and second ones of said plurality of selectable light paths at a fundamental frequency,
at least a second pair of said plurality of electrode means providing means for switching light propagated in said first one of said plurality of selectable light paths into third and fourth ones of said plurality of light paths at a harmonic of said fundamental frequency.

12. Apparatus as described in claim 11 wherein said harmonic and fundamental voltages have frequencies in the ratio of two to one.

13. Apparatus as described in claim 12 wherein the amplitudes of said harmonic and fundamental voltages are substantially equal.

14. Apparatus as described in claim 11 further including at least a third pair of said plurality of electrode means providing means for switching light propagated in said second one of said plurality of selectable light paths into fifth and sixth ones of said plurality of light paths at said harmonic of said fundamental frequency.

15. Switchable optical coupling apparatus comprising:
a plate of electro-optically sensitive material having opposed major faces and opposed minor faces,
optical port means at one of said minor faces,
a plurality of optical port means at said opposed minor face,
electrode means at one of said major faces,
a plurality of electrode means at said opposed major face, said latter plurality of electrode means comprising:
first electrode means for coupling light with respect to said optical port means,
second and third electrode means placed side-by-side in electrically insulated contiguous relation with respect to said first electrode means,
fourth and fifth electrode means placed side-by-side in electrically insulated contiguous relation with respect to said second electrode means, and
sixth and seventh electrode means placed side-by-side in electrically insulated contiguous relation with respect to said third electrode means, and
signal generator means for exciting said second and third electrode means at a fundamental sinusoidal frequency,
said signal generator means being additionally adapted for exciting said fourth, fifth, sixth, and seventh electrode means at a harmonic of said fundamental frequency, whereby light flow is switched successively with respect to said port means and to successive ones of said plurality of port means.

16. Apparatus as described in claim 15 wherein opposite phases of said fundamental frequency are coupled respectively to said second and third electrode means.

17. Apparatus as described in claim 16 wherein opposite phases of said harmonic frequency are coupled respectively to said fourth and sixth and to said fifth and seventh electrode means.

18. Switchable optical coupling apparatus comprising:
- a plate of optically transparent material characterized by an electric field variable index of refraction and having first and second ends,
- first optical port means at said first end,
- a plurality of optical port means at said second end,
- means for establishing a plurality of potential discrete optical paths within said plate between said first optical port means and said plurality of optical port means,
- first optical switch means cooperative with said first optical port means and including a first pair of electrode means for excitation at a fundamental sinusoidal voltage for directing light flow between first and second of said optical paths and said optical port means, and
- second optical switch means cooperative with said first optical switch means and including second and third electrode means for excitation at a harmonic of said fundamental voltage for directing light flow with respect to the first and second of said optical paths and said plurality of optical port means.

19. Apparatus as described in claim 18 wherein said harmonic voltage has a frequency double that of said fundamental voltage.

20. Apparatus as described in claim 18 wherein the amplitude of said harmonic voltage is approximately N times that of said fundamental voltage, where N extends substantially over the range of values 2 and 2.1.

* * * * *